United States Patent
Xi et al.

(10) Patent No.: US 8,462,283 B2
(45) Date of Patent: Jun. 11, 2013

(54) LIQUID CRYSTAL DISPLAY PANEL, PIXEL ARRAY SUBSTRATE AND PIXEL STRUCTURE THEREOF

(75) Inventors: Peng-Bo Xi, Hsin-Chu (TW);
Shin-Hung Yeh, Hsin-Chu (TW);
Wei-Kai Huang, Hsin-Chu (TW);
Ya-Ling Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 219 days.

(21) Appl. No.: 13/017,033

(22) Filed: Jan. 30, 2011

(65) Prior Publication Data
US 2012/0026447 A1 Feb. 2, 2012

(30) Foreign Application Priority Data
Jul. 28, 2010 (TW) ................................ 99124891 A

(51) Int. Cl.
*G02F 1/1343* (2006.01)
(52) U.S. Cl.
USPC ................................ 349/39; 349/38; 349/144
(58) Field of Classification Search
USPC ....................................................... 349/38, 39
See application file for complete search history.

(56) References Cited

U.S. PATENT DOCUMENTS

| 5,457,553 | A   | * | 10/1995 | Mori ................................. 349/39 |
| 6,909,415 | B2  |   | 6/2005  | Kumagawa et al. |
| 6,982,775 | B2  | * | 1/2006  | Lee et al. ....................... 349/139 |
| 7,746,416 | B2  | * | 6/2010  | Wu .................................. 349/38 |
| 2004/0246404 | A1 | * | 12/2004 | Elliott et al. .................... 349/88 |
| 2007/0002193 | A1 |   | 1/2007 | Kim |
| 2007/0126941 | A1 |   | 6/2007 | Cheng |
| 2007/0279566 | A1 |   | 12/2007 | Huang |
| 2009/0251627 | A1 |   | 10/2009 | Itsumi |

FOREIGN PATENT DOCUMENTS
TW 526363 4/2003

* cited by examiner

*Primary Examiner* — Richard Kim
(74) *Attorney, Agent, or Firm* — Winston Hsu; Scott Margo

(57) ABSTRACT

A pixel structure includes at least one first sub-pixel electrode, at least one second sub-pixel electrode, at least one common line, at least one first transistor electrically connected to the first sub-pixel electrode, and at least one second transistor electrically connected to the second sub-pixel electrode. The common line overlaps and is coupled respectively with the first sub-pixel electrode and the second sub-pixel electrode so as to respectively form a first storage capacitor and a second storage capacitor. The second storage capacitor is larger than the first storage capacitor. A first adjusting capacitor of the first transistor is larger than a second adjusting capacitor of the second transistor.

23 Claims, 11 Drawing Sheets

FIG. 1 PRIOR ART

LIQUID CRYSTAL DISPLAY PANEL, PIXEL ARRAY SUBSTRATE AND PIXEL STRUCTURE THEREOF

BACKGROUND OF THE INVENTION

1. Field of the Invention

The present invention relates to a liquid crystal display panel, a pixel array substrate and a pixel structure thereof, and more particularly, to a liquid crystal display panel, a pixel array substrate and a pixel structure thereof having a storage capacitor of a green sub-pixel being larger than a storage capacitor of a red sub-pixel and a storage capacitor of a blue sub-pixel.

2. Description of the Prior Art

Generally, liquid crystal display panels have been widely applied to many kinds of portable electronic products in the market, such as notebooks and personal digital assistants (PDA), etc., because of having advantages of light weight, low power consumption and low radiation. When the liquid crystal display panel is driven, and liquid crystal molecules in the liquid crystal display panel are fixed at an angle too long, the liquid crystal molecules may have the permanent deformation, so that frames displayed by the liquid crystal display panel cannot be changed. For this reason, a polarity inversion driving method is used to avoid lowering the display quality of the liquid crystal display panel.

The polarity inversion driving method usually is divided into a frame inversion, a row inversion, a column inversion and a dot inversion. Please refer to FIG. 1. FIG. 1 is a schematic diagram illustrating polarities of sub-pixels of the liquid crystal display panel utilizing the dot inversion driving method to display a white vertical-striped pattern according to the prior art. As shown in FIG. 1, the liquid crystal display panel 10 of the prior art has a plurality of sub-pixels 12 arranged as a matrix. The sub-pixels 12 in each column display the same color, and the sub-pixels 12 in each row respectively display red, green, and blue sequentially. A red sub-pixel 12, a green sub-pixel 12 adjacent to the red sub-pixel 12, and a blue sub-pixel 12 adjacent to the green sub-pixel 12 in the same row constitute a pixel 18. When the liquid crystal display panel 10 is driven by the dot inversion driving method, the sub-pixels 12 in each row have a polarity arrangement of positive polarity 14 and negative polarity 16 being arranged alternatively in sequence, and the sub-pixels 12 in each column have a polarity arrangement of positive polarity 14 and negative polarity 16 being arranged alternatively in sequence.

Moreover, when the liquid crystal display panel 10 is tested by displaying the white vertical-striped pattern, the pixels in the same row alternatively display bright and dark in sequence, and the pixels in the same column display bright or dark. In the dot inversion driving method, each of the red sub-pixels 12 and the blue sub-pixels 12 that are turned on and disposed in the first row has positive polarity 14, and each of the green sub-pixels 12 that are turned on and disposed in the first row has negative polarity 16. The polarity of each sub-pixel 12 is determined by comparing a pixel voltage of each sub-pixel with a common voltage. When the pixel voltage is higher than the common voltage, the polarity of each sub-pixel 12 is positive polarity 14, and the pixel electrode is at a high voltage level. On the contrary, when the pixel voltage is lower than the common voltage, the pixel electrode is at a low voltage level, and the polarity of each sub-pixel 12 is negative polarity 16.

Please refer to FIG. 2. FIG. 2 is a schematic diagram illustrating waveforms of a pixel voltage of the red/blue sub-pixel and a pixel voltage of the green sub-pixel in the first row of FIG. 1. As shown in FIG. 1 and FIG. 2, the data signals Vd provided to the red sub-pixels 12 and the blue sub-pixels 12 are at the high voltage level, and the data signals Vd provided to the green sub-pixels 12 are at the low voltage level, so that the number of sub-pixels 12 having positive polarity 14 are larger than the number of sub-pixels 12 having negative polarity 16 in the same row. Thus, the common voltage Vcom would be affected by the data signals Vd provided to the red sub-pixels 12 and the blue sub-pixels 12 and shift toward the high voltage level. Accordingly, the voltage difference for driving each red/blue sub-pixel 12 is reduced, and the voltage difference for driving each green sub-pixel 12 is increased, so that the gray scale displayed by each red/blue sub-pixel 12 is lower than the gray scale displayed by each green sub-pixel 12. Therefore, when the liquid crystal display panel 10 of the prior art is driven by the dot inversion driving method to display the white vertical-striped pattern, a greenish frame is generated by the liquid crystal display panel 10. As a result, to solve the problem of the greenish frame is an objective in this field.

SUMMARY OF THE INVENTION

It is therefore an objective of the present invention to provide a liquid crystal display panel, a pixel array substrate and a pixel structure to solve the problem of the greenish frame mentioned above.

According to a preferred embodiment, the present invention provides a pixel structure disposed on a substrate having a first sub-pixel region and a second sub-pixel region. The pixel structure includes at least one first sub-pixel electrode and at least one second sub-pixel electrode, at least one common line, at least one first transistor and at least one second transistor, and a scan line. The first sub-pixel electrode and the second sub-pixel electrode are disposed on the substrate in the first sub-pixel region and the second sub-pixel region respectively, and the common line is disposed on the substrate and passes through the first sub-pixel region and the second sub-pixel region. The common line overlaps and is coupled with the first sub-pixel electrode to form at least one first storage capacitor, and the common line overlaps and is coupled with the second sub-pixel electrode to form at least one second storage capacitor, wherein the second storage capacitor is larger than the first storage capacitor. The first transistor and the second transistor are disposed on the substrate. The first transistor is electrically connected to the first sub-pixel electrode, and the second transistor is electrically connected to the second sub-pixel electrode. The first transistor has a first adjusting capacitor, and the second transistor has a second adjusting capacitor, wherein the first adjusting capacitor is larger than the second adjusting capacitor. The scan line is disposed on the substrate and passing through the first sub-pixel region and the second sub-pixel region, and the scan line is electrically connected to the first transistor and the second transistor.

According to another preferred embodiment, the present invention further provides a pixel array substrate, which includes a substrate, and a plurality of pixel structures. The substrate has a plurality of pixel regions arranged as a matrix, and each pixel region has a first sub-pixel region and a second sub-pixel region. The pixel structures are respectively disposed in each pixel region, and each pixel structure includes at least one first sub-pixel electrode and at least one second sub-pixel electrode, at least one common line, at least one first transistor and at least one second transistor, and a scan line. The first sub-pixel electrode and the second sub-pixel electrode are respectively disposed on the substrate in each first sub-pixel region and each second sub-pixel region, and the common line is disposed on the substrate and passes through the first sub-pixel region and the second sub-pixel region. The common line overlaps and is coupled with the first sub-pixel electrode to form at least one first storage capacitor, and the common line overlaps and is coupled with the second sub-pixel electrode to form at least one second storage capacitor, wherein the second storage capacitor is larger than the first storage capacitor. The first transistor and the second transistor are disposed on the substrate, and are electrically connected to the first sub-pixel electrode and the second sub-pixel electrode respectively. The first transistor has a first adjusting capacitor, and the second transistor has a second adjusting capacitor, wherein the first adjusting capacitor is larger than the second adjusting capacitor. The scan line is disposed on the substrate and passes through the first sub-pixel region and the second sub-pixel region, and the scan line is electrically connected to the first transistor and the second transistor.

According to another preferred embodiment, the present invention further provides a pixel array substrate, which includes a first substrate, a plurality of pixel structures, a second substrate, and a liquid crystal layer. The first substrate has a plurality of pixel regions arranged as a matrix, and each pixel region has a first sub-pixel region and a second sub-pixel region. The pixel structures are disposed in each pixel region respectively, and each pixel structure includes at least one first sub-pixel electrode and at least one second sub-pixel electrode, at least one common line, at least one first transistor and at least one second transistor, and a scan line. The first sub-pixel electrode and the second sub-pixel electrode are disposed on the first substrate in each first sub-pixel region and each second sub-pixel region respectively, and the common line is disposed on the first substrate and passes through the first sub-pixel region and the second sub-pixel region. The common line overlaps and is coupled with the first sub-pixel electrode to form at least one first storage capacitor, and the common line overlaps and is coupled with the second sub-pixel electrode to form at least one second storage capacitor, wherein the second storage capacitor is larger than the first storage capacitor. The first transistor and the second transistor are disposed on the first substrate, and are electrically connected to the first sub-pixel electrode and the second sub-pixel electrode respectively. The first transistor has a first adjusting capacitor, and the second transistor has a second adjusting capacitor, wherein the first adjusting capacitor is larger than the second adjusting capacitor. The scan line is disposed on the first substrate and passes through the first sub-pixel region and the second sub-pixel region, and the scan line is electrically connected to the first transistor and the second transistor. The second substrate is disposed opposite to the first substrate, and the liquid crystal layer is disposed between the first substrate and the second substrate.

The second storage capacitor of the pixel structure is adjusted to be larger than the first storage capacitor in the present invention, so that the coupling effect of the second sub-pixel electrode with the positive polarity to the common line can be larger than the coupling effect of the first sub-pixel electrode with the negative polarity to the common line. The influence of the pixel voltage on the common voltage of the common line can be accordingly reduced, and the problem of the greenish frame can be solved. In addition, the second adjusting capacitor of the pixel structure is adjusted to be smaller than the first adjusting capacitor in the present invention, so that the insufficient brightness or the flicker of the frame that is resulted from the second storage capacitor being larger than the first storage capacitor can be avoided, and the problem of the greenish frame can be solved in normal operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Figure 1:
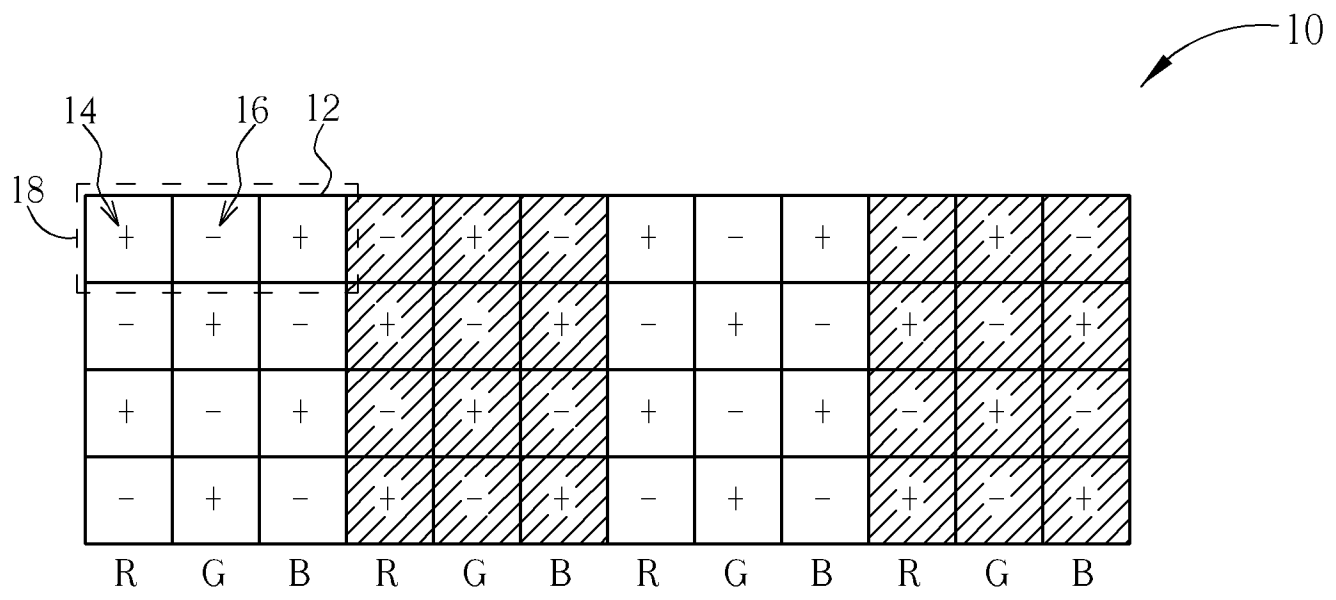

FIG. 1 is a schematic diagram illustrating polarities of sub-pixels of the liquid crystal display panel utilizing the dot inversion driving method to display a white vertical-striped pattern according to the prior art.

DETAILED DESCRIPTION

To provide a better understanding of the present invention, exemplary embodiments will be detailed as follows. The exemplary embodiments of the present invention are illustrated in the accompanying drawings with numbered elements to elaborate the contents and effects to be achieved.

Figure 2:
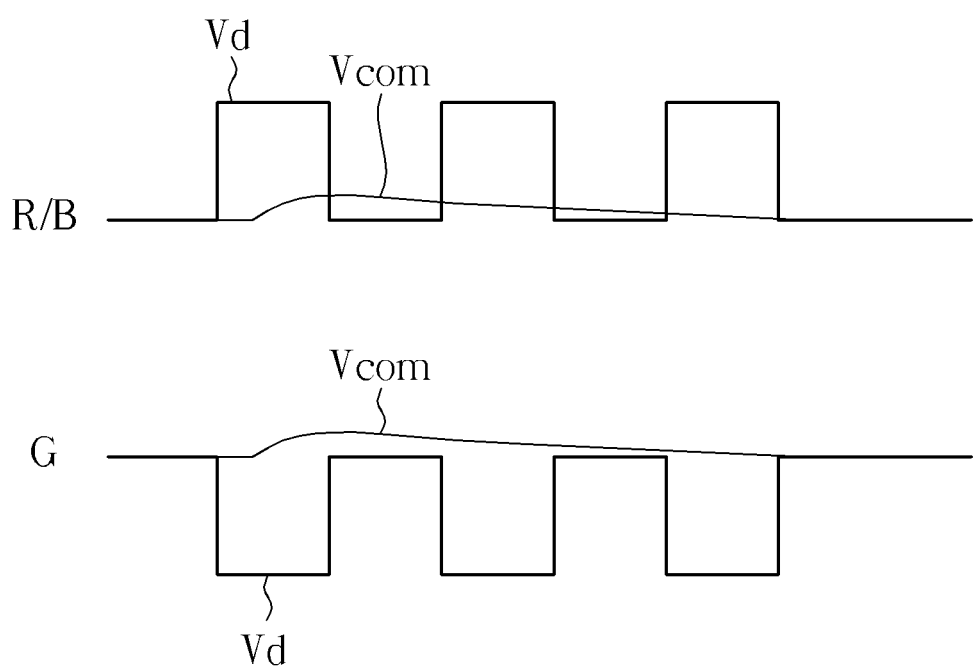
FIG. 2 is a schematic diagram illustrating waveforms of a pixel voltage of the red/blue sub-pixel and a pixel voltage of the green sub-pixel in the first row of FIG. 1.
Figure 3:
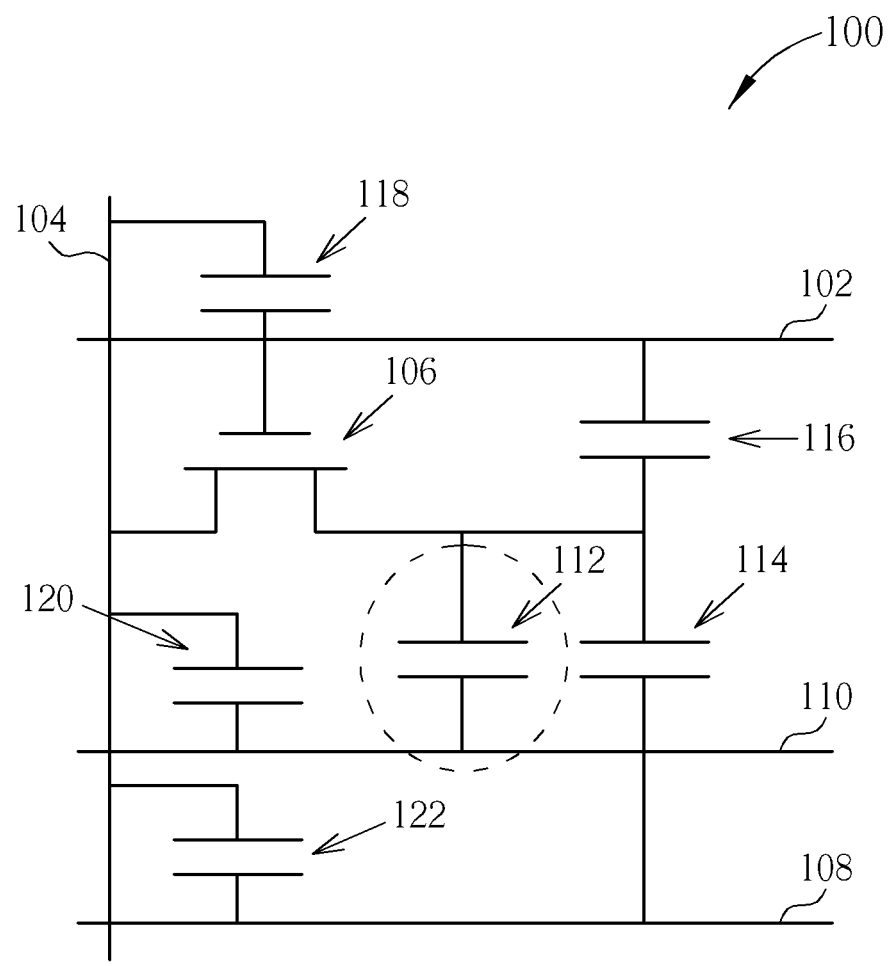
FIG. 3 is a schematic diagram illustrating an equivalent circuit of a sub-pixel according to the present invention.

Please refer to FIG. 3. FIG. 3 is a schematic diagram illustrating an equivalent circuit of a sub-pixel according to the present invention. As shown in FIG. 3, the sub-pixel 100 of the present invention, which includes a transistor 106 and a pixel electrode (not shown in FIG. 3), is electrically connected to a scan line 102 and a data line 104. The pixel electrode is electrically connected to a drain of the transistor 106; the data line 104 is electrically connected to a source of the transistor 106; and the scan line 102 is electrically connected to a gate of the transistor 106. The pixel electrode overlaps and is coupled with a common line 110, so that a storage capacitor 112 is coupled between the pixel electrode and the common line 110. The pixel electrode overlaps and is coupled with a common electrode 108 on a color filter substrate, so that a liquid crystal capacitor 114 is coupled between the pixel electrode and the common electrode 108. The data line 104, the scan line 102, the common line 110, and the transistor 106 are disposed on a pixel array substrate, and the common electrode 108 is disposed on the color filter substrate. In addition, a coupling capacitor 116 is coupled between the drain of the transistor 106 and the scan line 102; a coupling capacitor 118 is coupled between the data line 104 and the scan line 102; a coupling capacitor 120 is coupled between the data line 104 and the common line 110 on the pixel array substrate; and a coupling capacitor 122 is coupled between the data line 104 and the common electrode 108 on the color filter substrate. As mentioned above, when the transistor 106 is turned on by receiving a scan signal, a data signal is provided to the pixel electrode through the transistor 106. At the same time, because of the coupling capacitors coupled between the data line 104 and the common electrode 108 or between the data line 104 and the common line 110, such as the coupling capacitor 120 between the data line 104 and the common line 110 on the pixel array substrate, the coupling capacitor 122 between the data line 104 and the common electrode 108 on the color filter substrate, the storage capacitor 112 and the liquid crystal capacitor 114, the voltage of the common electrode 108 and the voltage of the common line 110 are affected by the data signal to shift.

For this reason, in order to solve the problem of the greenish frame due to unbalanced polarity, the storage capacitor 112 of each sub-pixel in the present invention is adjusted in the case of the coupling capacitor 122 between the data line 104 and the common electrode 108 on the color filter substrate, the coupling capacitor 120 between the data line 104 and the common line 110 on the pixel array substrate and the liquid crystal capacitor 114 being unchanged, so that a red sub-pixel, a green sub-pixel and a blue sub-pixel in a pixel region can have different capacitances of the storage capacitors. Accordingly, the red sub-pixel, the green sub-pixel and the blue sub-pixel can be adjusted to have the same pixel voltage, and the problem of the greenish frame can be solved.

Figure 4:
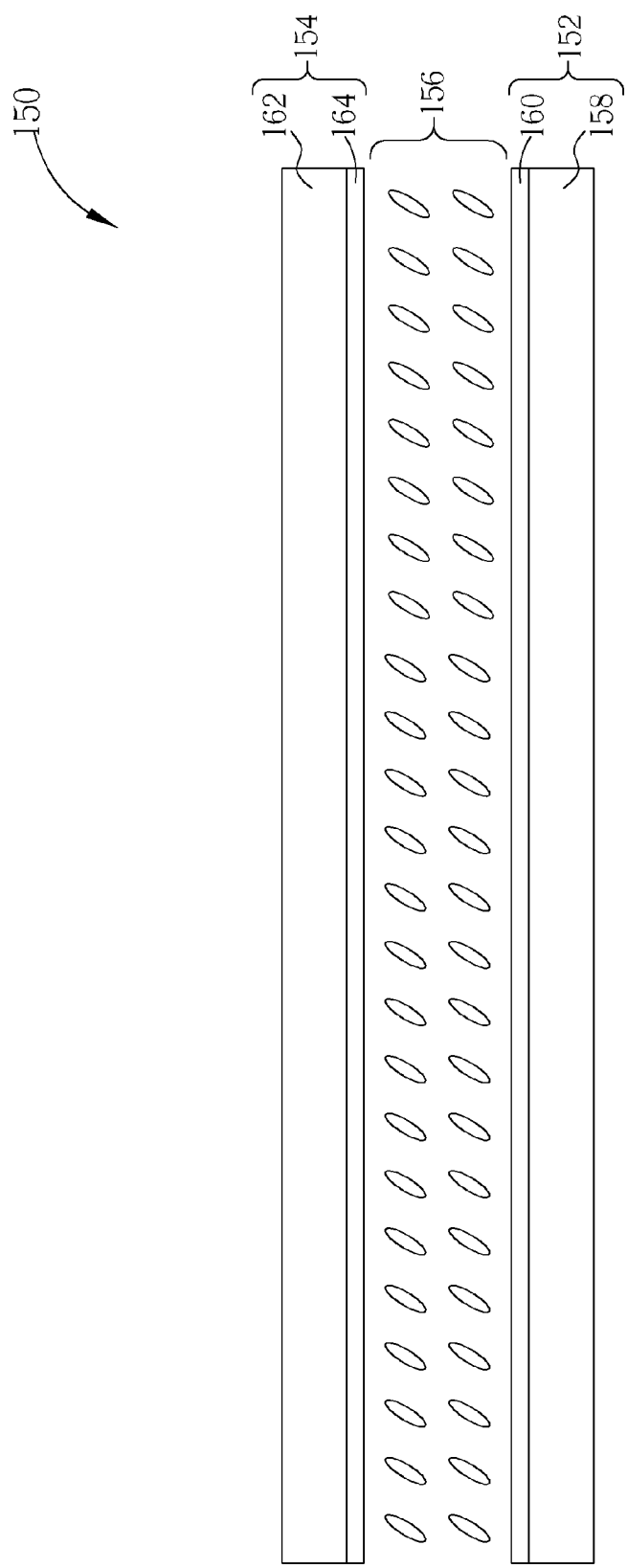
FIG. 4 is a schematic diagram illustrating a cross-sectional view of a liquid crystal display panel according to a first preferred embodiment of the present invention.
Figure 5:
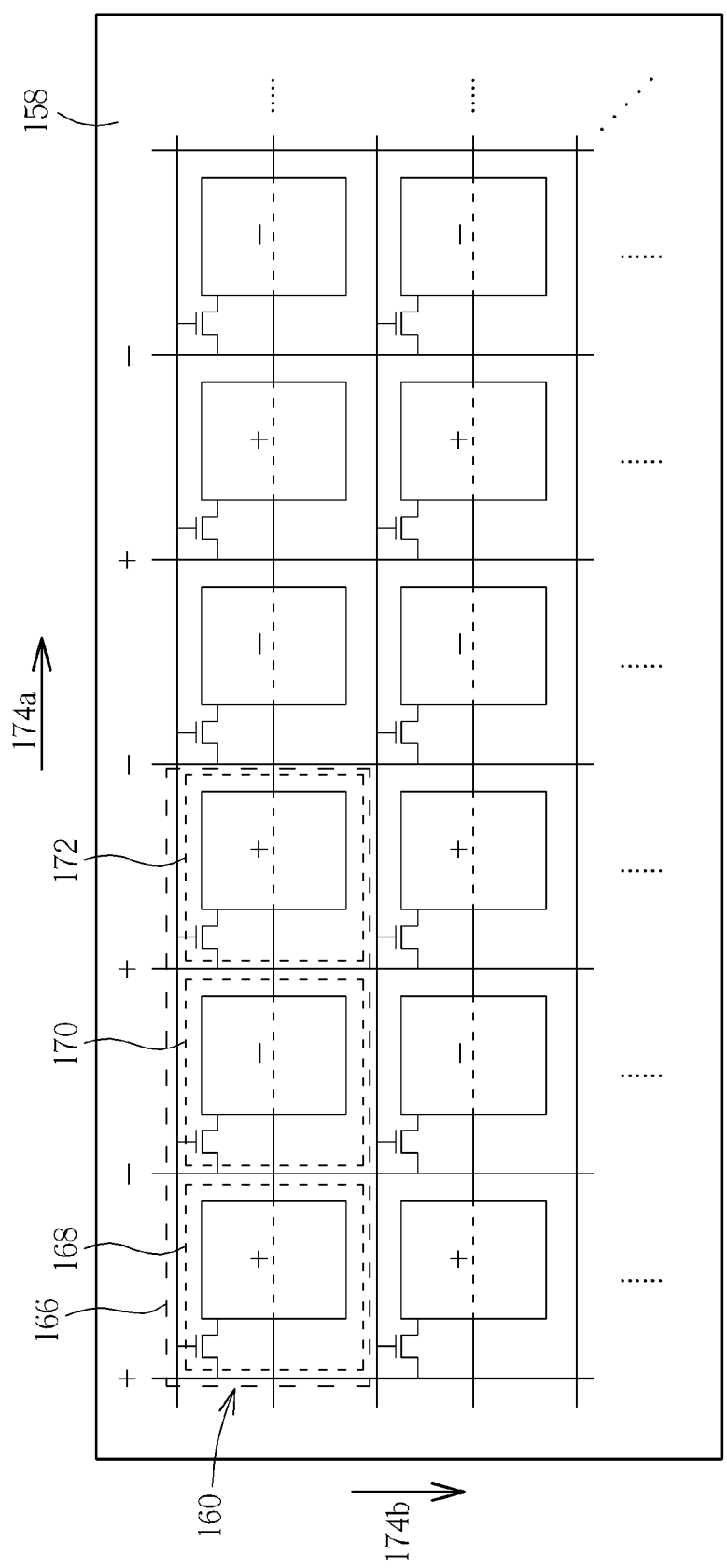
FIG. 5 is a schematic diagram illustrating a top view of a pixel array substrate according to the first preferred embodiment of the present invention.

Please refer to FIG. 4 and FIG. 5. FIG. 4 is a schematic diagram illustrating a cross-sectional view of a liquid crystal display panel according to a first preferred embodiment of the present invention, and FIG. 5 is a schematic diagram illustrating a top view of a pixel array substrate according to the first preferred embodiment of the present invention. As shown in FIG. 4, the liquid crystal display panel 130 includes a pixel array substrate 152, a color filter substrate 154 disposed opposite to the pixel array substrate 152 and a liquid crystal layer 156 disposed between the pixel array substrate 152 and the color filter substrate 154. In addition, the pixel array substrate 152 includes a first substrate 158 and a plurality of pixel structure 160 disposed on the first substrate 158. Moreover, the color filter substrate 154 includes a second substrate 162 and a common electrode disposed on the second substrate 162. As shown in FIG. 5, the first substrate 158 has a plurality of pixel regions 166 arranged as a matrix, and each pixel structure 160 is disposed in each pixel region 166. Each pixel region 166 includes a first sub-pixel region 168, a second sub-pixel region 170 and a third sub-pixel region 172, which are sequentially arranged along a first direction 174a. In this preferred embodiment, the first sub-pixel region 168 is a red sub-pixel region; the second sub-pixel region 170 is a green sub-pixel region; and the third sub-pixel region 172 is a blue sub-pixel region, but the first sub-pixel region 168, the second sub-pixel region 170 and the third sub-pixel region 172 of the present invention are not limited herein. The first sub-pixel region 168, the second sub-pixel region 170 or the third sub-pixel region 172 can be any one of the red sub-pixel region, the green sub-pixel region and the blue sub-pixel region, or the sub-pixel region with other colors in order that a combination of the first sub-pixel region 168, the second sub-pixel region 170 and the third sub-pixel region 172 can display white. Furthermore, cell gaps respectively in the first sub-pixel region 168, the second sub-pixel region 170 and the third sub-pixel region 172 are the same, and thus the liquid crystal display panel 150 has the liquid crystal capacitors with the same capacitances respectively in each first sub-pixel region 168, each second sub-pixel region 170 and each third sub-pixel region 172.

Figure 6:
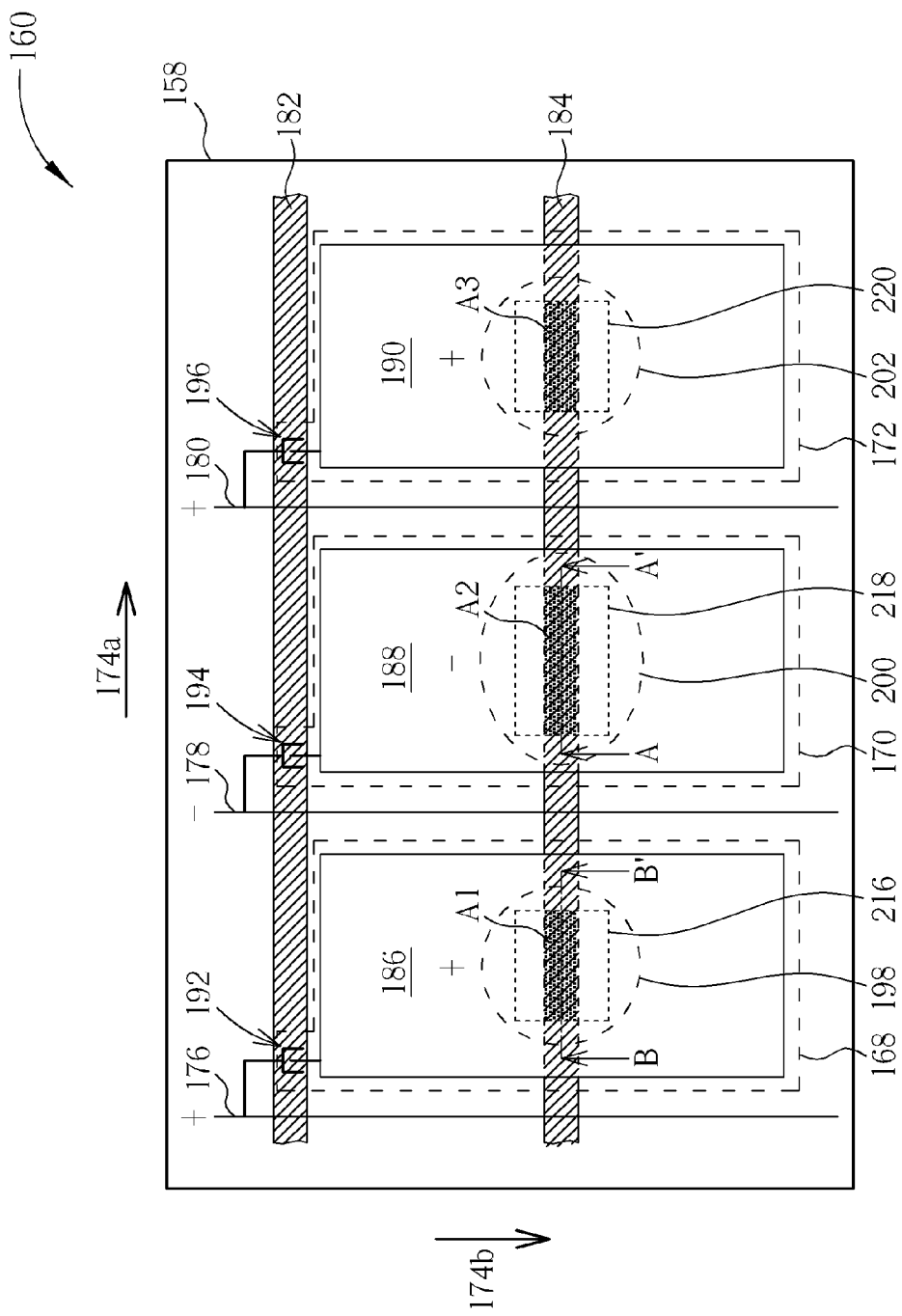
FIG. 6 is a schematic diagram illustrating a top view of each pixel structure according to the first preferred embodiment of the present invention.

Please refer to FIG. 6 along with referring to FIG. 5. FIG. 6 is a schematic diagram illustrating a top view of each pixel structure according to the first preferred embodiment of the present invention. As shown in FIG. 6, each pixel structure 160 of this preferred embodiment includes a first data line 176, a second data line 178, a third data line 180, a scan line 182, a common line 184, a first sub-pixel electrode 186, a second sub-pixel electrode 188, a third sub-pixel electrode 190, a first transistor 192, a second transistor 194, and a third transistor 196. The first data line, the second data line 178 and the third data line 180 are disposed along a second direction 174b, and are disposed on the first substrate 158 at a side of the first sub-pixel region 168, at a side of the second sub-pixel region 170 and at a side of the third sub-pixel region 172, respectively. The first data line 176, the second data line 178 and the third data line 180 are electrically connected to a source of the first transistor 192, a source of the second transistor 194 and a source of the third transistor 196, respectively. The scan line 182 is disposed on the first substrate 158, and passes through the first sub-pixel region 168, the second sub-pixel region 170 and the third sub-pixel region 172. Furthermore, the scan line 182 crosses the first data line 176, the second data line 178 and the third data line 180 and are electrically connected to a gate of the first transistor 192, a gate of the second transistor 194 and a gate of the third transistor 196. In addition, a drain of the first transistor 192, a drain of the second transistor 194 and a drain of the third transistor 196 are electrically connected to the first sub-pixel electrode 186, the second sub-pixel electrode 188 and the third sub-pixel electrode 190 respectively. The first sub-pixel electrode 186, the second sub-pixel electrode 188 and the third sub-pixel electrode 190 are disposed on the first substrate 158 in the first sub-pixel region 168, the second sub-pixel region 170 and the third sub-pixel region 172 respectively, and can be constituted by a transparent conductive material, such as indium tin oxide or indium zinc oxide, but is not limited herein. Moreover, the common line 184 is disposed on the first substrate 158, and passes through the first sub-pixel region 168, the second sub-pixel region 170 and the third sub-pixel region 172. It should be noted that the common line 184 overlaps and is coupled with the first sub-pixel electrode 186, the second sub-pixel electrode 188 and the third sub-pixel electrode 190 to form a first storage capacitor 198, a second storage capacitor 200 and a third storage capacitor 202. The second storage capacitor 200 is larger than the first storage capacitor 198 and the third storage capacitor 202, and the first storage capacitor 198 is substantially equal to the third storage capacitor 202.

When the liquid crystal display panel 150 starts displaying, the scan line 182 transfers a scan signal to the gate of the first transistor 192, the gate of the second transistor 194 and the gate of the third transistor 196, so that the first transistor 192, the second transistor 194 and the third transistor 196 can be turned on. Meanwhile, the first data line 176 and the third data line 180 transfer display signals with a first polarity to the first sub-pixel electrode 186 and the third sub-pixel electrode 190 respectively, and the second data line 178 transfer a display signal with a second polarity opposite to the first polarity to the second sub-pixel electrode 188. When the first polarity is positive polarity, the second polarity is negative polarity, and vice versa. Accordingly, in this preferred embodiment, the first sub-pixel electrode 186 and the third sub-pixel electrode 190 have the first polarity, and the second sub-pixel electrode 188 has the second polarity. In each pixel structure 160 of this preferred embodiment, although a number of the sub-pixel electrodes with the positive polarity is larger than a number of the sub-pixel electrodes with the negative polarity, the first storage capacitor 198 and the third storage capacitor 202 that are respectively electrically connected to the first sub-pixel electrode 186 and the third pixel electrode 190 are smaller than the second storage capacitor 200 that is electrically connected to the second sub-pixel electrode 188, and thus a coupling effect generated by the first sub-pixel electrode 186 or the third sub-pixel electrode 190 coupled with the common line 184 is smaller than a coupling effect generated by the second sub-pixel electrode 188 coupled with the common line 184. For this reason, in this preferred embodiment, the total coupling effect generated by the first sub-pixel electrode 186 and the third sub-pixel electrode 190 coupled with the common line 184 can be adjusted to be the same as the coupling effect generated by the second sub-pixel electrode 188 coupled with the common line 184, i.e. the coupling effects of the display signals with the positive polarity and the display signals with the negative polarity to the common line 18 are the same. Accordingly, the voltage of the common line 184 would not change, and the problem of the greenish frame can be solved.

Figure 7:
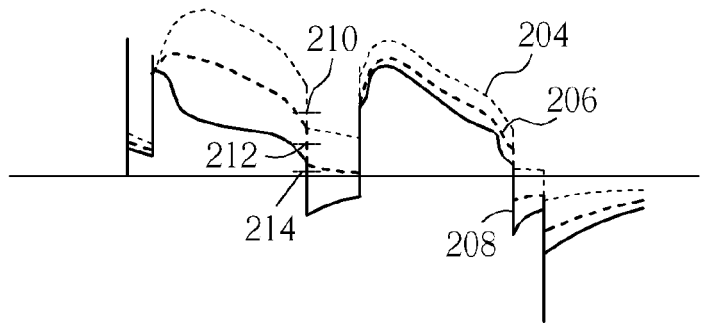
FIG. 7 is a schematic diagram illustrating waveforms of the pixel voltages of the pixel structure with different ratios of the first storage capacitor and the third storage capacitor to the second storage capacitor according to the first preferred embodiment of the present invention.

The following description further details the relation between the ratio of the storage capacitors of each pixel structure and a voltage of each sub-pixel electrode to clarify the effect of adjusting the first storage capacitor, the second storage capacitor and the third storage capacitor in the present invention. Please refer to FIG. 7 along with referring to FIG. 6. FIG. 7 is a schematic diagram illustrating waveforms of the pixel voltages of the pixel structure with different ratios of the first storage capacitor and the third storage capacitor to the second storage capacitor according to the first preferred embodiment of the present invention. As shown in FIG. 7, in a first pixel voltage waveform 204, the first storage capacitor 198, the second storage capacitor 200 and the third storage capacitor 202 are not adjusted, and the first pixel voltage waveform 204 is the same as the waveform of the pixel voltage of the liquid crystal display panel of the prior art. In addition, the first pixel voltage waveform 204 has a first high voltage level 210. In a second pixel voltage waveform 206, a ratio of each of the first storage capacitor 198 and the third storage capacitor 202 to the liquid crystal capacitor is substantially 1.3, and a ratio of the second storage capacitor 200 to the liquid crystal capacitor is substantially 1.8. The second pixel voltage waveform 206 has a second high voltage level 212. In a third pixel voltage waveform 208, a ratio of each of the first storage capacitor 198 and the third storage capacitor 202 to the liquid crystal capacitor is substantially 0.9, and a ratio of the second storage capacitor 200 to the liquid crystal capacitor is substantially 1.8. The third pixel voltage waveform 208 has a third high voltage level 214. It should be noted that the first high voltage level 210 is larger than the second high voltage level 212 and the third high voltage level 214, i.e. the first high voltage level 210 has the largest offset shifted from a zero voltage level. Furthermore, the second high voltage level 212 is larger than the third high voltage level 214, and the third high voltage level 214 is close to the zero voltage level. As we can see from the aforementioned description, when the first storage capacitor 198 and the third storage capacitor 202 are smaller than the second storage capacitor 200, the issue of the high voltage level of the pixel voltage being shifted can be improved. When the second storage capacitor 200 is substantially twice as large as each of the first storage capacitor 198 and the third storage capacitor 202, the improvement of the high voltage level of the pixel voltage being shifted is better.

Please refer to FIG. 6 again. Each pixel structure 160 of this preferred embodiment further includes a first transparent electrode 216, a second transparent electrode 218, and a third transparent electrode 220, respectively used to adjust the first storage capacitor 198, the second storage capacitor 200 and the third storage capacitor 202. The first transparent electrode 216, the second transparent electrode 218 and the third transparent electrode 220 are electrically connected to the first sub-pixel electrode 186, the second sub-pixel electrode 188 and the third sub-pixel electrode 190 respectively. Thus, the first transparent electrode 216, the second transparent electrode 218 and the third transparent electrode 220 can be coupled with the common line 184 to form the first storage capacitor 198, the second storage capacitor 200 and the third storage capacitor 202. In this preferred embodiment, the first transparent electrode 216, the second transparent electrode 218 and the third transparent electrode 220 can be composed of a transparent conductive material, such as indium tin oxide or indium zinc oxide, so that change of an aperture ratio of each pixel structure can be prevented.

Figure 8:
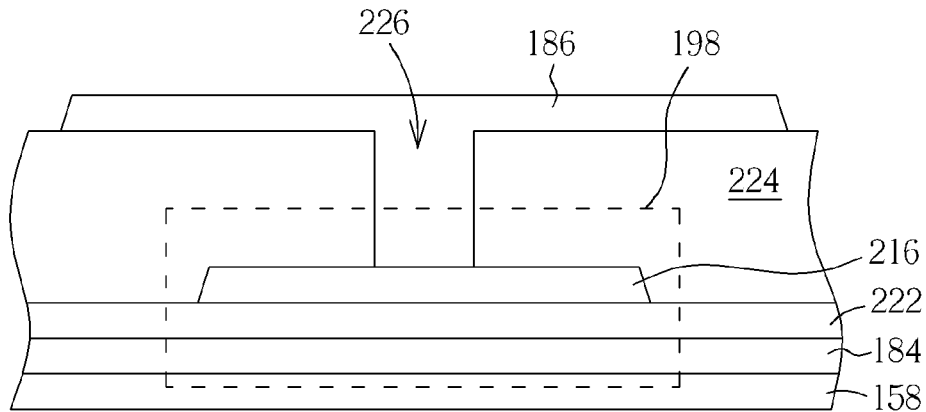
FIG. 8 is a schematic diagram illustrating a cross-sectional view of each pixel structure along a line A-A' shown in FIG. 6 according to the first preferred embodiment of the present invention.
Figure 9:
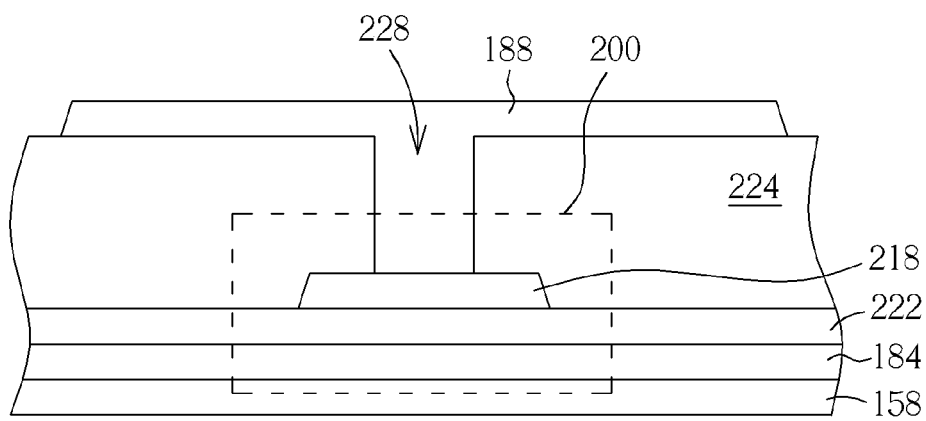
FIG. 9 is a schematic diagram illustrating a cross-sectional view of each pixel structure along a line B-B' shown in FIG. 6 according to the first preferred embodiment of the present invention.

In order to clearly describe the structures of the first storage capacitor, the second storage capacitor and the third storage capacitor, only the first storage capacitor and the second storage capacitor are taken for the illustration because the first storage capacitor and the third storage capacitor are of similar structure. Please refer to FIG. 8 and FIG. 9 along with referring to FIG. 6. FIG. 8 is a schematic diagram illustrating a cross-sectional view of each pixel structure along a line A-A' shown in FIG. 6 according to the first preferred embodiment of the present invention. FIG. 9 is a schematic diagram illustrating a cross-sectional view of each pixel structure along a line B-B' shown in FIG. 6 according to the first preferred embodiment of the present invention. As shown in FIG. 6 and FIG. 8, the first transparent electrode 216 is disposed between the first sub-pixel electrode 186 and the common line 184, and each pixel structure 160 further includes an insulating layer 222 and a passivation layer 224. The insulating layer 22 is disposed between the first transparent electrode 216 and the common line 184, and is used to electrically insulate the common line 184 from the first transparent electrode 216. The passivation layer 224 is disposed between the first sub-pixel electrode 186 and the insulating layer 222, and is used to protect electronic devices and wires on the first substrate 158. In addition, the passivation layer 224 has an opening 226, and the first transparent electrode 216 can be in contact with the first sub-pixel electrode 186 through the opening 226. The first transparent electrode 216 and the common line 184 have a first overlapping area A1, used to adjust the first storage capacitor 198. Similarly, the third transparent electrode 220 is disposed between the third sub-pixel electrode 190 and the common line 184, and the passivation layer 224 further has an opening, so that the third transparent electrode 220 can be in contact with the third sub-pixel electrode 190 through the opening. Furthermore, the third transparent electrode 220 and the common line 184 have a second overlapping area A2, used to adjust the third storage capacitor 202. As shown in FIG. 6 and FIG. 9, the second transparent electrode 218 is disposed between the second sub-pixel electrode 188 and the common line 184, and the insulating layer 222 is disposed between the second transparent electrode 218 and the common line 184. The passivation layer 224 is disposed between the second sub-pixel electrode 188 and the insulating layer 222, and the passivation layer 224 further has an opening 228, so that the second transparent electrode 218 can be in contact with the second sub-pixel electrode 188 through the opening 228. Moreover, the second transparent electrode 220 and the common line 184 have a third overlapping area A3, used to adjust the second storage capacitor 200. In this preferred embodiment, an area of the second transparent electrode 218 is larger than an area of the first transparent electrode 216 or the third transparent electrode 220, so that the second overlapping area A2 is larger than the first overlapping area A1 and the third overlapping area A3. Accordingly, the second storage capacitor 200 is adjusted to be larger than the first storage capacitor 198 and the third storage capacitor 202. However, the first storage capacitor 198, the second storage capacitor 200 and the third storage capacitor 202 are not limited to be changed by adjusting the areas of the first transparent electrode 216, the second transparent electrode 218 and the third transparent electrode 220, and can be changed by adjusting the size of the common line 184 to make the second overlapping area A2 be larger than the first overlapping area A1 and the third overlapping area A3. Thus, the capacitances of the first storage capacitor 198, the second storage capacitor 200 and the third storage capacitor 202 can be changed. Or, thicknesses or dielectric constants of dielectric layers respectively disposed between an upper electrode and a lower electrode of the first storage capacitor 198, between an upper electrode and a lower electrode of the second storage capacitor 200 and between an upper electrode and a lower electrode of the third storage electrode 202 also can be adjusted to change the capacitances of the first storage capacitor 198, the second storage capacitor 200 and the third storage capacitor 202.

Figure 10:
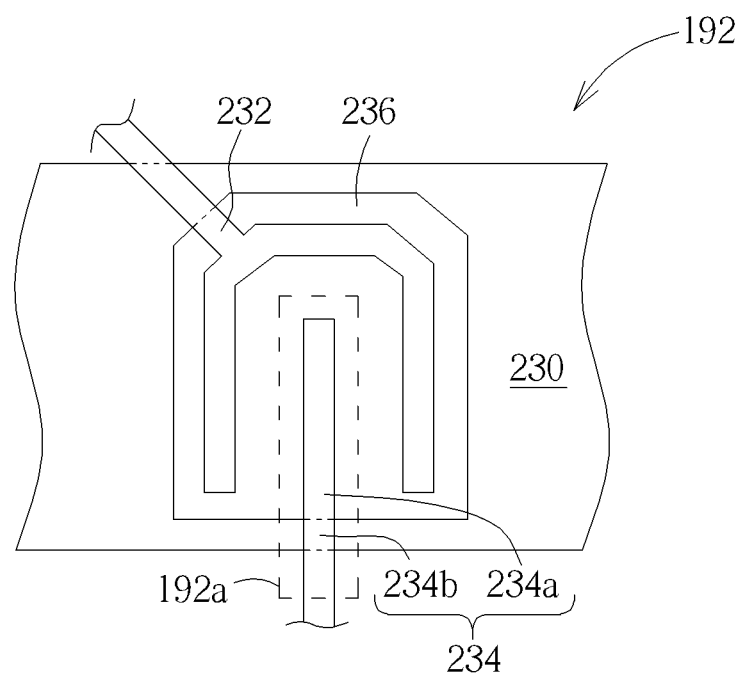
FIG. 10 is a schematic diagram illustrating an enlarged view of a first transistor according to the first preferred embodiment of the present invention.
Figure 11:
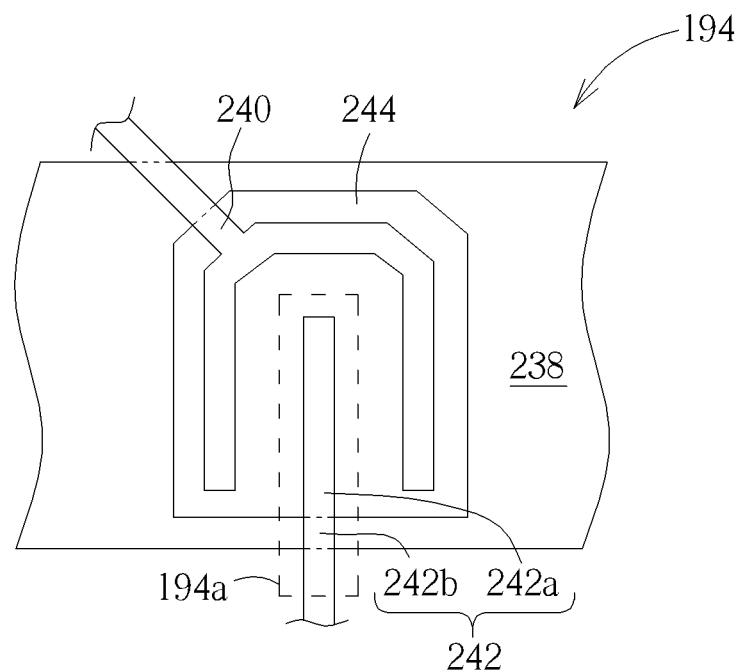
FIG. 11 is a schematic diagram illustrating an enlarged view of a second transistor according to the first preferred embodiment of the present invention.

It should be noted that the variation of the pixel voltage of each sub-pixel electrode in the liquid crystal display panel is in inverse proportion to total coupling capacitance in each sub-pixel region, and thus the variation of the pixel voltage of each sub-pixel electrode varies with the variation of the storage capacitor in each sub-pixel region. However, according to a formula for calculating a feed-through voltage, when the variations of the pixel voltages of the sub-pixel electrodes are different, the insufficient brightness or the flicker of the frame easily happens. In order to have the same variation of the pixel voltage of the each sub-pixel electrode, the coupling capacitor between the gate and the drain of the transistor in each sub-pixel region is preferably adjusted in inverse proportion to the storage capacitor, so that the affection of the total coupling capacitor in each sub-pixel region to the variation of the pixel voltage can be balanced. Please refer to FIG. 10 and FIG. 11. FIG. 10 is a schematic diagram illustrating an enlarged view of a first transistor according to the first preferred embodiment of the present invention, and FIG. 11 is a schematic diagram illustrating an enlarged view of a second transistor according to the first preferred embodiment of the present invention. As shown in FIG. 10, the first transistor 192 includes a first gate 230, a first source 232, a first drain 234, and a first semiconductor layer 236. The first gate 230 is a part of the scan line, and the first semiconductor layer 236 is disposed on the first gate 230. The first source 232 and the first drain 234 are disposed on the first semiconductor layer 236, and overlap the first gate 230. The first transistor 192 has a first adjusting capacitor 192a, and the first adjusting capacitor 192a is formed by the first drain 234 overlapping and being coupled with the first gate 230. The first drain 234 includes a first section 234a and a second section 234b, and the first section 234a overlaps the first semiconductor layer 236. Furthermore, the second section part 234b does not overlap the first semiconductor layer 236, but only overlaps the first gate 230. As shown in FIG. 11, the second transistor includes a second gate 238, a second source 240, a second drain 242 and a second semiconductor layer 244. The second gate 238 is also a part of the scan line, and the semiconductor layer 244 is disposed on the second gate 238. The second source 240 and the second drain 242 are disposed on the second semiconductor layer 244, and overlap the second gate 238. The second transistor 194 has a second adjusting capacitor 194a, and the second adjusting capacitor 194a is formed by the second drain 242 overlapping and being coupled with the second gate 238. The second drain 242 includes a third section 242a and a fourth section 242b, and the third section 242a has the same area as the first section 234a. An area of the fourth section 242b is smaller than an area of the second section 234b. For this reason, the areas of the second section 234b and the fourth section 242b of this preferred embodiment can be adjusted so that the overlapping area of the first drain 234 and the first gate 230 is larger than the overlapping area of the second drain 242 and the second gate 238. Thus, the first adjusting capacitor 192a is larger than the second adjusting capacitor 194a. In addition, the third transistor is the same as the first transistor in this preferred embodiment, as shown in FIG. 10. The third transistor includes a third gate, a third source and a third drain. The third transistor has a third adjusting capacitor, and the third adjusting capacitor is formed by the third gate overlapping and being coupled with the third drain. In this preferred embodiment, the third adjusting capacitor has the same capacitance as the first adjusting capacitor 192a. Furthermore, each adjusting capacitor of the present invention is not limited to be adjusted by changing the area of the section without overlapping the semiconductor layer, and the first adjusting capacitor 192a, the second adjusting capacitor 194a and the third adjusting capacitor also can be adjusted by changing the overlapping area of the first section 234a and the semiconductor layer and the overlapping area of the third section 242a and the semiconductor layer. Therefore, the liquid crystal display panel 150 of this preferred embodiment can be prevented from having the insufficient brightness or the flicker of the frame due to the second storage capacitor 200 being larger than the first storage capacitor 198 and the third storage capacitor 202 by adjusting the first adjusting capacitor 192a and the third adjusting capacitor to be larger than the second adjusting capacitor 194a, and the problem of the greenish frame can be solved in normal operation.

Figure 12:
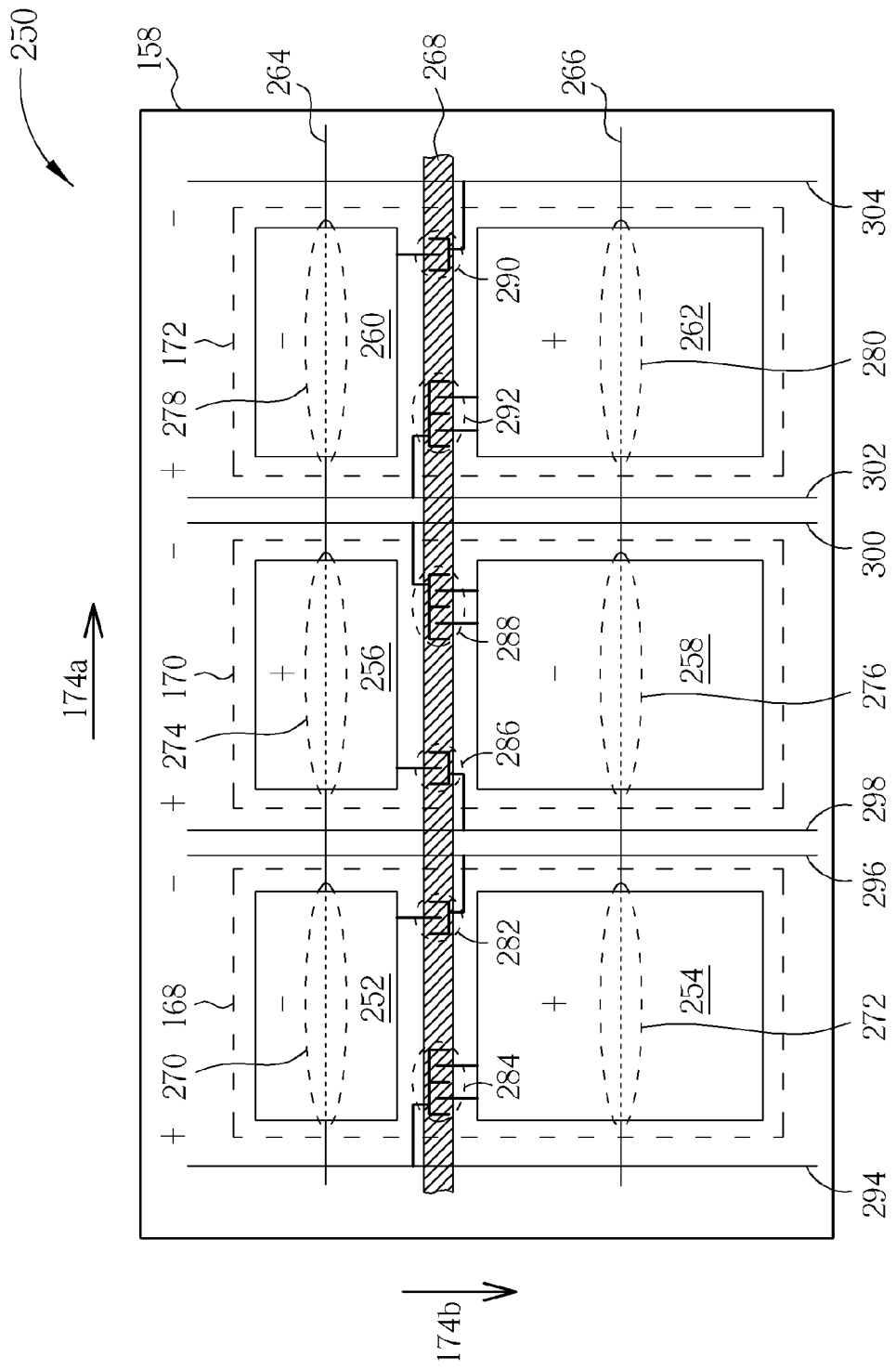
FIG. 12 is a schematic diagram illustrating a top view of a pixel structure according to a second preferred embodiment of the present invention.

Please refer to FIG. 12. FIG. 12 is a schematic diagram illustrating a top view of a pixel structure according to a second preferred embodiment of the present invention. The components in the following embodiments the same as the first preferred embodiment are denoted by the same numerals, and the same parts are not detailed redundantly. As shown in FIG. 12, compared with the first preferred embodiment, the pixel structure 250 of this preferred embodiment includes a first upper sub-pixel electrode 252, a first lower sub-pixel electrode 254, a second upper sub-pixel electrode 256, a second lower sub-pixel electrode 258, a third upper sub-pixel electrode 260, a third lower sub-pixel electrode 262, a first common line 264, a second common line 266, and a scan line 268. The first upper sub-pixel electrode 252 and the first lower sub-pixel electrode 254 are disposed in the first sub-pixel region 168; the second upper sub-pixel electrode 256 and the second lower sub-pixel electrode 258 are disposed in the second sub-pixel region 170; and the third upper sub-pixel electrode 260 and the third lower sub-pixel electrode 262 are disposed in the third sub-pixel region 172. The first common line 264 and the second common line 266 pass through the first sub-pixel region 168, the second sub-pixel region 170 and the third sub-pixel region 172 respectively. Furthermore, the first common line 264 overlaps and is coupled with the first upper sub-pixel electrode 252 to form a first upper storage capacitor 270, and the second common line 266 overlaps and is coupled with the first lower sub-pixel electrode 254 to form a first lower storage capacitor 272. The first common line 264 overlaps and is coupled with the second upper sub-pixel electrode to form a second upper storage capacitor 274, and the second common line 266 overlaps and is coupled with the second lower sub-pixel electrode to form a second lower storage capacitor 276. The third upper sub-pixel electrode 260 overlaps and is coupled with the first common line 264 to form a third upper storage capacitor 278, and the third upper pixel electrode 262 overlaps and is coupled with the second common line 266 to form a third lower storage capacitor 280. In addition, the scan line 268 is disposed on the first substrate 158 along the first direction 174a, and passes through the first sub-pixel region 168, the second sub-pixel region 170 and the third sub-pixel region 172. In this preferred embodiment, the second upper storage capacitor 274 is larger than the first upper storage capacitor 270 and the third upper storage capacitor 278, and the first lower storage capacitor 272, the second lower storage capacitor 276 and the third lower storage capacitor 280 have the same capacitance.

Moreover, the pixel structure of this embodiment further includes a first upper transistor 282, a first lower transistor 284, a second upper transistor 286, a second lower transistor 288, a third upper transistor 290, a third lower transistor 298, a first data line 294, a second data line 296, a third data line 298, a fourth data line 300, a fifth data line 302, and a sixth data line 304. A gate of the first upper transistor 282, a gate of the first lower transistor 284, a gate of the second upper transistor 286, a gate of the second lower transistor 288, a gate of the third upper transistor 290 and a gate of the third lower transistor 292 are electrically connected to the scan line 268, and a source of the first upper transistor 282, a source of the first lower transistor 284, a source of the second upper transistor 286, a source of the second lower transistor 288, a source of the third upper transistor 290 and a source of the third lower transistor 292 are electrically connected to the second data line 296, the first data line 294, the third data line 298, the fourth data line 300, the sixth data line 304 and the fifth data line 302 respectively. A drain of the first upper transistor 282, a drain of the first lower transistor 284, a drain of the second upper transistor 286, a drain of the second lower transistor 288, a drain of the third upper transistor 290 and a drain of the third lower transistor 292 are electrically connected to the first upper sub-pixel electrode 252, the first lower sub-pixel electrode 254, the second upper sub-pixel electrode 256, the second lower sub-pixel electrode 258, the third upper sub-pixel electrode 260 and the third lower sub-pixel electrode 262 respectively. In addition, the first data line 294, the second data line 296, the third data line 298, the fourth data line 300, the fifth data line 302 and a sixth data line 304 are disposed on the first substrate 158 along the second direction 174b, and are sequentially arranged along the first direction 174a. The first data line 294, the second data line 296, the third data line 298, the fourth data line 300, the fifth data line 302 and a sixth data line 304 cross the scan line 268. Furthermore, the first data line 294, the third data line 298 and the fifth data line 302 are respectively disposed at a side of the first sub-pixel region 168, a side of the second sub-pixel region 170 and a side of the third sub-pixel region 172, and the second data line 296, the fourth data line 300 and the sixth data line 304 are respectively disposed at the other side of the first sub-pixel region 168, the other side of the second sub-pixel region 170 and the other side of the third sub-pixel region 172.

When the pixel structure 250 of this embodiment starts displaying, the first data line 294, the third data line 298 and the fifth data line 302 transfer the display signals with the first polarity to the first lower sub-pixel electrode 254, the second upper sub-pixel electrode 256 and the third lower sub-pixel electrode 262 respectively, so that the first lower sub-pixel electrode 254, the second upper sub-pixel electrode 256 and the third lower sub-pixel electrode 262 can have the first polarity. Meanwhile, the second data line 296, the fourth data line 300 and the sixth data line 304 transfer the display signals with the second polarity to the first upper sub-pixel electrode 252, the second lower sub-pixel electrode 258 and the third upper sub-pixel electrode 260 respectively, so that the first upper sub-pixel electrode 252, the second lower sub-pixel electrode 258 and the third upper sub-pixel electrode 260 can have the second polarity. The first polarity is opposite to the second polarity. In this preferred embodiment, the first polarity is positive polarity, and the second polarity is negative polarity. The first polarity and the second polarity of the present invention are not limited to this, and vice versa. In this preferred embodiment, the second upper storage capacitor 274 of second upper sub-pixel electrode 256 is adjusted to be larger than the first upper storage capacitor 270 of the first upper sub-pixel electrode 252 and the third upper storage capacitor 278 of the third upper sub-pixel electrode 260, and thus the coupling effect of the first upper sub-pixel electrode 252 and the third upper sub-pixel electrode 260 with negative polarity to the first common line 264 is smaller than the coupling effect of the second upper sub-pixel electrode 256 with positive polarity to the first common line 264. Therefore, the problem of the greenish frame can be solved.

Furthermore, the first upper transistor 282 has a first upper adjusting capacitor; the second upper transistor 286 has a second upper adjusting capacitor; and the third upper transistor 290 has a third upper adjusting capacitor. The first lower transistor 284 has a first lower adjusting capacitor; the second lower transistor has a second lower adjusting capacitor; and the third lower transistor 292 has a third lower adjusting capacitor. In this preferred embodiment, the second upper adjusting capacitor is smaller than the first upper adjusting capacitor and the third upper adjusting capacitor, and the first lower adjusting capacitor, the second lower adjusting capacitor and the third lower adjusting capacitor have the same capacitance. Accordingly, the inconsistence of the variations of the pixel voltages due to the increase of the second upper storage capacitor can be balanced by adjusting the second upper adjusting capacitor. Because the first upper adjusting capacitor, the first lower adjusting capacitor, the second lower adjusting capacitor, the third upper adjusting capacitor and the third lower adjusting capacitor have the same structure as the first adjusting capacitor of the above-mentioned first preferred embodiment and the second upper adjusting capacitor has the same structure as the second adjusting capacitor of the above-mentioned first preferred embodiment, the structures of the first upper adjusting capacitor, the first lower adjusting capacitor, the second lower adjusting capacitor, the third upper adjusting capacitor, the third lower adjusting capacitor and the second upper adjusting capacitor are not detailed redundantly.

Figure 13:
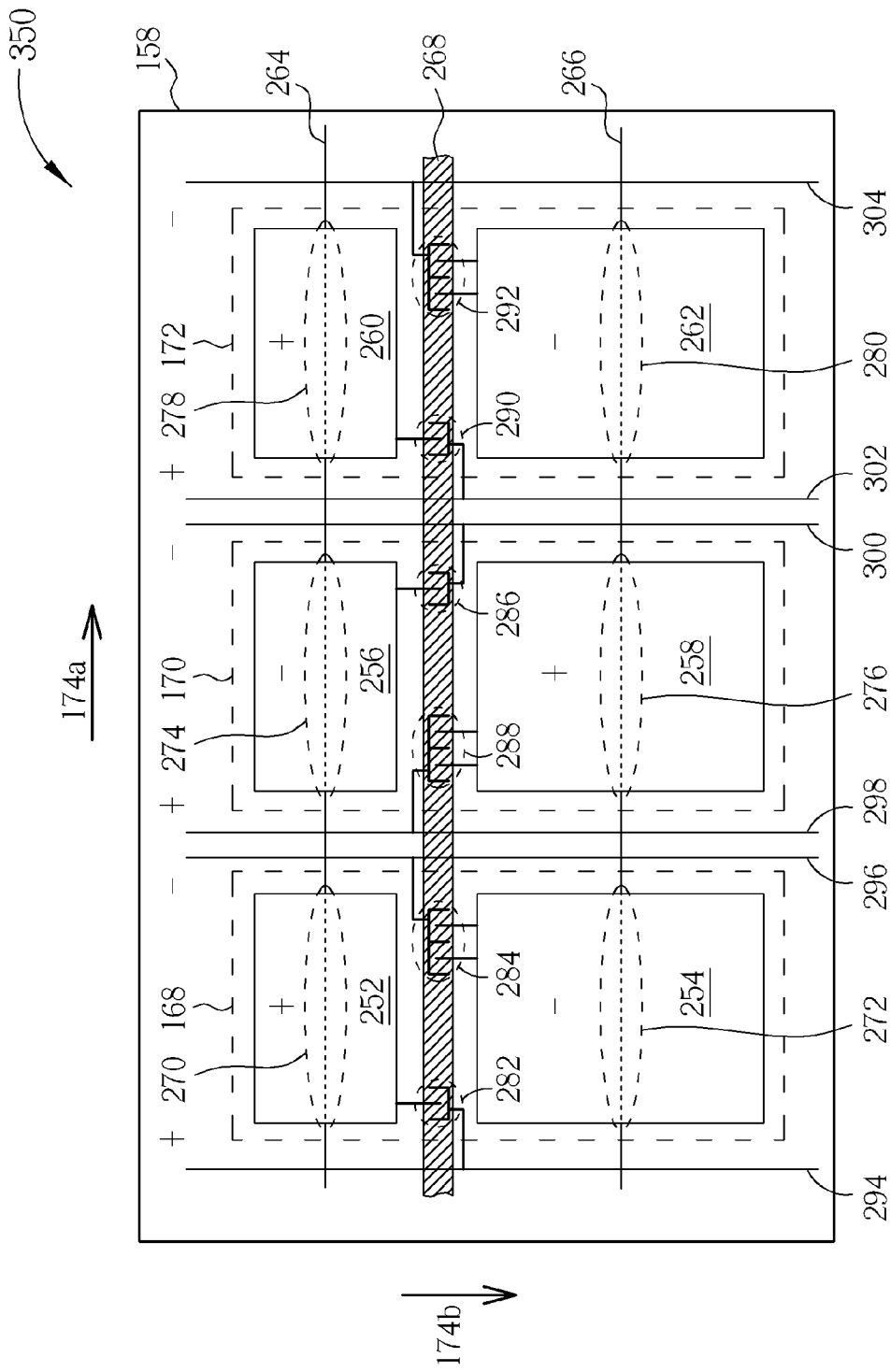
FIG. 13 is a schematic diagram illustrating a top view of a pixel structure according to a third preferred embodiment of the present invention.

The pixel structure of the present invention is not limited to adjust the second upper storage capacitor, and also can adjust the second lower storage capacitor in the second sub-pixel region. Furthermore, the present invention is not limited that the sources of the first upper transistor, the first lower transistor, the second upper transistor, the second lower transistor, the third upper transistor and the third lower transistor are electrically to the second data line, the first data line, the third data line, the fourth data line, the sixth data line and the fifth data line respectively. Please refer FIG. 13. FIG. 13 is a schematic diagram illustrating a top view of a pixel structure according to a third preferred embodiment of the present invention. The components in the following embodiments the same as the second preferred embodiment are denoted by the same numerals, and the same parts are not detailed redundantly. As shown in FIG. 13, compared with the second preferred embodiment, the second lower storage capacitor 276 of the pixel structure 350 is larger than the first lower storage capacitor 272 and the third lower storage capacitor 280, and the first lower adjusting capacitor and the third lower adjusting capacitor are larger than the second lower storage capacitor in this embodiment. In addition, the source of the first upper transistor 282 is electrically connected to the first data line 294; the source of the first lower transistor 284 is electrically connected to the second data line 296; the source of the second upper transistor 286 is electrically connected to the fourth data line 300; the source of the second lower transistor 288 is electrically connected to the third data line 298; the source of the third upper transistor 290 is electrically connected to the fifth data line 302; and the source of the third lower transistor 292 is electrically connected to the sixth data line 304.

Figure 14:
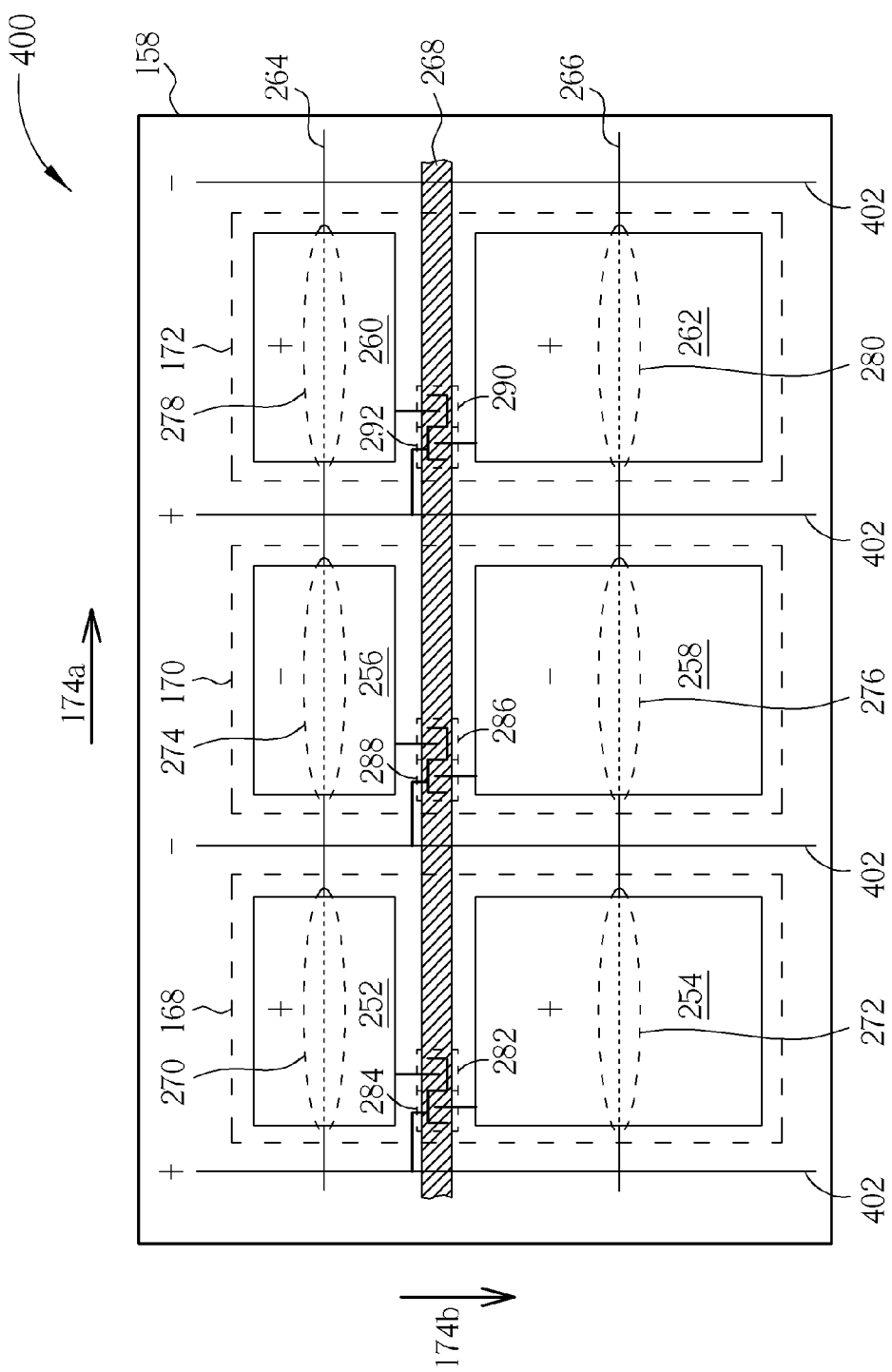
FIG. 14 is a schematic diagram illustrating a top view of a pixel structure according to a fourth preferred embodiment of the present invention.

Please refer to FIG. 14. FIG. 14 is a schematic diagram illustrating a top view of a pixel structure according to a fourth preferred embodiment of the present invention. As shown in FIG. 14, compared with the second preferred embodiment, the pixel structure 400 of this preferred embodiment only includes three data lines 402. The three data lines 402 are disposed on the first substrate 158 at a side of the first sub-pixel region 168, a side of the second sub-pixel region 170 and a side of the third sub-pixel region 172 respectively, and cross the scan line 268. In addition, the sources of the first upper transistor 282 and the first lower transistor 284 are electrically connected to each other; the sources of the second upper transistor 286 and the second lower transistor 288 are electrically connected to each other; and the sources of the third upper transistor 290 and the third lower transistor 292 are electrically connected to each other. In this preferred embodiment, the second lower storage capacitor 276 is larger than the first storage capacitor 272 and the third lower storage capacitor 280, and the second lower adjusting capacitor is smaller than the first lower adjusting capacitor and the third lower adjusting capacitor. Furthermore, the first upper storage capacitor 270, the second upper storage capacitor 274 and the third upper storage capacitor 278 have the same capacitance, and the first upper adjusting capacitor, the second upper adjusting capacitor and the third upper adjusting capacitor have the same capacitance.

In summary, the second storage capacitor of the pixel structure is adjusted to be larger than the first storage capacitor and the third storage capacitor in the present invention, so that the coupling effect of the second sub-pixel electrode with positive polarity to the common line can be larger than the coupling effect of the first/third sub-pixel electrode with negative polarity to the common line. The influence of the pixel voltage on the common voltage of the common line can be accordingly reduced, and the problem of the greenish frame can be solved. In addition, the second adjusting capacitor of the pixel structure is adjusted to be smaller than the first adjusting capacitor and the third adjusting capacitor in the present invention, so that the insufficient brightness or the flicker of the frame that is resulted from the second storage capacitor being larger than the first storage capacitor and the third capacitor can be avoided, and the problem of the greenish frame can be solved in normal operation.

Those skilled in the art will readily observe that numerous modifications and alterations of the device and method may be made while retaining the teachings of the invention.

What is claimed is:

1. A pixel structure, disposed on a substrate having a first sub-pixel region, a second sub-pixel region and a third sub-pixel region, the pixel structure comprising:
    at least one first sub-pixel electrode, at least one second sub-pixel electrode and at least one third sub-pixel electrode, respectively disposed on the substrate in the first sub-pixel region, the second sub-pixel region and the third sub-pixel region, the second sub-pixel electrode being disposed between the first sub-pixel electrode and the third sub-pixel electrode;
    at least one common line, disposed on the substrate and passing through the first sub-pixel region, the second sub-pixel region and the third sub-pixel region, the common line overlapping and being coupled with the first sub-pixel electrode to form at least one first storage capacitor, the common line overlapping and being coupled with the second sub-pixel electrode to form at least one second storage capacitor, and the common line overlapping and being coupled with the third sub-pixel electrode to form at least one third storage capacitor, wherein the second storage capacitor is larger than the first storage capacitor and the third storage capacitor;
    at least one first transistor, at least one second transistor and at least one third transistor, disposed on the substrate, the first transistor being electrically connected to the first sub-pixel electrode, the second transistor being electrically connected to the second sub-pixel electrode, the third transistor being electrically connected to the third sub-pixel electrode, the first transistor having a first adjusting capacitor, the second transistor having a second adjusting capacitor, and the third transistor having a third adjusting capacitor, wherein the first adjusting capacitor is larger than the second adjusting capacitor and the third adjusting capacitor is larger than the second adjusting capacitor; and
    a scan line, disposed on the substrate and substantially passing through the first sub-pixel region, the second sub-pixel region and the third sub-pixel region, the scan line being electrically connected to the first transistor, the second transistor and the third transistor.

2. The pixel structure according to claim 1, wherein the first sub-pixel electrode and the third sub-pixel electrode have a first polarity, and the second sub-pixel electrode has a second polarity opposite to the first polarity.

3. The pixel structure according to claim 2, wherein the first polarity comprises a positive polarity, and the second polarity comprises a negative polarity.

4. The pixel structure according to claim 1, wherein the first sub-pixel region is a red sub-pixel region, the second sub-pixel region is a green sub-pixel region, and the third sub-pixel region is a blue sub-pixel region.

5. The pixel structure according to claim 1, wherein the first transistor comprises a first gate, a first source and a first drain, and the first adjusting capacitor is formed by the first gate overlapping and being coupled with the first drain.

6. The pixel structure according to claim 1, wherein the second transistor comprises a second gate, a second source and a second drain, and the second adjusting capacitor is formed by the second gate overlapping and being coupled with the second drain.

7. The pixel structure according to claim 1, wherein the third transistor comprises a third gate, a third source and a third drain, and a third adjusting capacitor is formed by the third gate overlapping and being coupled with the third drain.

8. The pixel structure according to claim 7, further comprising:
three data line, disposed on the substrate at a side of the first sub-pixel region, a side of the second sub-pixel region and a side of the third sub-pixel region respectively, and the data lines crossing the scan line, wherein the data lines are electrically connected to the first transistor, the second transistor and the third transistor respectively.

9. The pixel structure according to claim 1, wherein a capacitance of the second storage capacitor is substantially twice as large as a capacitance of the first storage capacitor.

10. The pixel structure according to claim 1, wherein the first sub-pixel electrode comprises a first upper sub-pixel electrode and a first lower sub-pixel electrode, the second sub-pixel electrode comprises a second upper sub-pixel electrode and a second lower sub-pixel electrode, and the third sub-pixel electrode comprises a third upper sub-pixel electrode and a third lower sub-pixel electrode.

11. The pixel structure according to claim 10, wherein each of the first lower sub-pixel electrode, the second upper sub-pixel electrode and the third lower sub-pixel electrode has a first polarity, and each of the first upper sub-pixel electrode, the second lower sub-pixel electrode and the third upper sub-pixel electrode has a second polarity opposite to the first polarity.

12. The pixel structure according to claim 10, wherein the common line comprises a first common line and a second common line, passing through the first sub-pixel region, the second sub-pixel region and the third sub-pixel region respectively.

13. The pixel structure according to claim 12, wherein the first storage capacitor comprises a first upper storage capacitor and a first lower storage capacitor, the first upper storage capacitor is formed by the first common line overlapping and being coupled with the first upper sub-pixel electrode, and the first lower storage capacitor is formed by the second common line overlapping and being coupled with the first lower sub-pixel electrode.

14. The pixel structure according to claim 13, wherein the second storage capacitor comprises a second upper storage capacitor and a second lower storage capacitor, the second upper storage capacitor is formed by the first common line overlapping and being coupled with the second upper sub-pixel electrode, and the second lower storage capacitor is formed by the second common line overlapping and being coupled with the second lower sub-pixel electrode.

15. The pixel structure according to claim 14, wherein a third upper storage capacitor is formed by the first common line overlapping and being coupled with the third upper sub-pixel electrode, and a third lower storage capacitor is formed by the second common line overlapping and being coupled with the third lower sub-pixel electrode.

16. The pixel structure according to claim 15, wherein the second upper storage capacitor is larger than the first upper storage capacitor and the third upper storage capacitor, and the second lower storage capacitor is larger than the first lower storage capacitor and the third lower storage capacitor.

17. The pixel structure according to claim 16, wherein the first transistor comprises a first upper transistor and a first lower transistor, electrically connected to the first upper sub-pixel electrode and the first lower sub-pixel electrode respectively, and the second transistor comprises a second upper transistor and a second lower transistor, electrically connected to the second upper sub-pixel electrode and the second lower sub-pixel electrode respectively.

18. The pixel structure according to claim 17, wherein a first upper adjusting capacitor of the first upper transistor is larger than a second upper adjusting capacitor of the second upper transistor, and a first lower adjusting capacitor of the first lower transistor is larger than a second lower adjusting capacitor of the second lower transistor.

19. The pixel structure according to claim 17, further comprising a third upper transistor and a third lower transistor, respectively electrically connected to the third upper sub-pixel electrode and the third lower sub-pixel electrode.

20. The pixel structure according to claim 19, further comprising:
six data lines, disposed on the substrate, and the data lines crossing the scan line, wherein the data lines electrically connected to the first upper transistor, the first lower transistor, the second upper transistor, the second lower transistor, the third upper transistor and the third lower transistor respectively.

21. A pixel array substrate, comprising:
a substrate, the substrate having a plurality of pixel regions, arranged as a matrix, wherein each pixel region has a first sub-pixel region, and a second sub-pixel region and a third sub-pixel region; and
a plurality of pixel structures, respectively disposed in each pixel region, and each pixel structure comprising:
at least one first sub-pixel electrode, at least one second sub-pixel electrode and at least one third sub-pixel electrode, respectively disposed on the substrate in each first sub-pixel region, each second sub-pixel region and the third sub-pixel region, the second sub-pixel electrode being disposed between the first sub-pixel electrode and the third sub-pixel electrode;
at least one common line, disposed on the substrate and passing through the first sub-pixel region, the second sub-pixel region and the third sub-pixel region, the common line overlapping and being coupled with the first sub-pixel electrode to form at least one first storage capacitor, the common line overlapping and being coupled with the second sub-pixel electrode to form at least one second storage capacitor, and the common line overlapping and being coupled with the third sub-pixel electrode to form at least one third storage capacitor, wherein the second storage capacitor is larger than the first storage capacitor and the third storage capacitor;
at least one first transistor, at least one second transistor and at least one third transistor, disposed on the substrate, the first transistor being electrically connected to the first sub-pixel electrode, and the second transistor being electrically connected to the second sub-pixel electrode, the third transistor being electrically connected to the third sub-pixel electrode, wherein the first transistor has a first adjusting capacitor, and the second transistor has a second adjusting capacitor, and the third transistor has a third adjusting capacitor, wherein the first adjusting capacitor is larger than the second adjusting capacitor and the third adjusting capacitor is larger than the second adjusting capacitor; and a scan line, disposed on the substrate and substantially passing through the first sub-pixel region, the second sub-pixel region and the third sub-pixel region, the scan line being electrically connected to the first transistor, the second transistor and the third transistor.

22. A liquid crystal display panel, comprising:

a first substrate, the first substrate having a plurality of pixel regions, arranged as a matrix, wherein each pixel region has a first sub-pixel region, a second sub-pixel region and a third sub-pixel region;

a plurality of pixel structures, respectively disposed in each pixel region, and each pixel structure comprising:

at least one first sub-pixel electrode, at least one second sub-pixel electrode and at least one third sub-pixel electrode, respectively disposed on the first substrate in each first sub-pixel region, each second sub-pixel region and each third sub-pixel region, each second sub-pixel electrode being disposed between the first sub-pixel electrode and the third sub-pixel electrode correspondingly;

at least one common line, disposed on the first substrate and passing through the first sub-pixel region, the second sub-pixel region and the third sub-pixel region, the common line overlapping and being coupled with the first sub-pixel electrode to form at least one first storage capacitor, the common line overlapping and being coupled with the second sub-pixel electrode to form at least one second storage capacitor, and the common line overlapping and being coupled with the third sub-pixel electrode to form at least one third storage capacitor, wherein the second storage capacitor is larger than the first storage capacitor and the third storage capacitor;

at least one first transistor, at least one second transistor and at least one third transistor, disposed on the first substrate, the first transistor being electrically connected to the first sub-pixel electrode, the second transistor being electrically connected to the second sub-pixel electrode, and the third transistor being electrically connected to the third sub-pixel electrode, the first transistor having a first adjusting capacitor, the second transistor having a second adjusting capacitor, and the third transistor having a third adjusting capacitor, wherein the first adjusting capacitor is larger than the second adjusting capacitor and the third adjusting capacitor is larger than the second adjusting capacitor; and a scan line, disposed on the first substrate and substantially passing through the first sub-pixel region the second sub-pixel region and the third sub-pixel region, the scan line being electrically connected to the first transistor, the second transistor and the third transistor;

a second substrate, disposed opposite to the first substrate; and a liquid crystal layer, disposed between the first substrate and the second substrate.

23. A pixel structure, disposed on a substrate having a first sub-pixel region, a second sub-pixel region and a third sub-pixel region, the pixel structure comprising:

at least one first sub-pixel electrode, at least one second sub-pixel electrode and at least one third sub-pixel electrode, respectively disposed on the substrate in the first sub-pixel region, the second sub-pixel region and the third sub-pixel region, the second sub-pixel electrode being disposed between the first sub-pixel electrode and the third sub-pixel electrode;

at least one common line, disposed on the substrate and passing through the first sub-pixel region, the second sub-pixel region and the third sub-pixel region, the common line overlapping and being coupled with the first sub-pixel electrode to form at least one first storage capacitor, the common line overlapping and being coupled with the second sub-pixel electrode to form at least one second storage capacitor, and the common line overlapping and being coupled with the third sub-pixel electrode to form at least one third storage capacitor, wherein the second storage capacitor is larger than the first storage capacitor and the third storage capacitor;

at least one first transistor, at least one second transistor and at least one third transistor, disposed on the substrate, the first transistor being electrically connected to the first sub-pixel electrode, the second transistor being electrically connected to the second sub-pixel electrode, the third transistor being electrically connected to the third sub-pixel electrode; and a scan line, disposed on the substrate and being electrically connected to the first transistor, the second transistor and the third transistor.

* * * * *